(12) United States Patent
Numata

(10) Patent No.: US 12,540,925 B2
(45) Date of Patent: Feb. 3, 2026

(54) COLUMN OVEN AND CHROMATOGRAPHY

(71) Applicant: SHIMADZU CORPORATION, Kyoto (JP)

(72) Inventor: Koji Numata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 860 days.

(21) Appl. No.: 16/747,044

(22) Filed: Jan. 20, 2020

(65) Prior Publication Data

US 2020/0292508 A1 Sep. 17, 2020

(30) Foreign Application Priority Data

Mar. 13, 2019 (JP) ................................ 2019-045350

(51) Int. Cl.
*G01N 30/30* (2006.01)
*G01N 30/02* (2006.01)

(52) U.S. Cl.
CPC ....... *G01N 30/30* (2013.01); *G01N 2030/025* (2013.01); *G01N 2030/027* (2013.01); *G01N 2030/3084* (2013.01)

(58) Field of Classification Search
CPC ....... G01N 2030/3084; G01N 2030/30; G01N 2030/3007; G01N 30/30; G01N 30/6047; B01D 15/10; B01D 15/22
See application file for complete search history.

(56) References Cited

U.S. PATENT DOCUMENTS 5,533,444 A * 7/1996 Parks ..................... F24C 15/322
219/400
5,634,961 A * 6/1997 Gordon .................. G01N 30/30
95/87

FOREIGN PATENT DOCUMENTS

| CA | 2406374 A1 | 11/2001 |
| CN | 204255917 U | * 4/2015 |
| CN | 205333589 U | 6/2016 |
| JP | 2000297989 A | 10/2000 |
| JP | 2003-531389 A | 10/2003 |
| JP | 2005061761 A | 3/2005 |

OTHER PUBLICATIONS

Office Action for corresponding JP Application No. 2019-045350 dated May 31, 2022, with English language machine translation.
Office Action for corresponding CN Application No. 2019-11067194.6 dated Aug. 23, 2022, with English language machine translation.

(Continued)

*Primary Examiner* — Ryan B Huang
(74) *Attorney, Agent, or Firm* — Renner, Otto, Boisselle & Sklar, LLP

(57) ABSTRACT

A column oven comprises: a hollow housing; an analysis column arranged in the housing and allowing circulation of a mobile phase in the analysis column; a heating portion configured to heat air; a swirl flow generation portion configured to discharge, as a swirl flow, the air heated by the heating portion into the housing; and a throttle portion configured to throttle the swirl flow when the swirl flow is discharged into the housing. The throttle portion has multiple through-holes formed to penetrate the throttle portion along a direction of discharging the swirl flow and arranged in a honeycomb shape as viewed from a swirl flow discharge side.

13 Claims, 3 Drawing Sheets

(56) References Cited

OTHER PUBLICATIONS

Office Action for corresponding CN Application No. 2019-11067194.6 dated Mar. 3, 2023, with English language machine translation.
Office Action for corresponding CN Application No. 2019-11067194.6 dated Sep. 20, 2023, with English language machine translation.

* cited by examiner

COLUMN OVEN AND CHROMATOGRAPHY

BACKGROUND OF THE INVENTION

1. Technical Field

The present invention relates to a column oven and a chromatography.

2. Background Art

A chromatography device configured to separate a mobile phase targeted for analysis into multiple components, i.e., analytes, by a separation column has been known (e.g., see Patent Literature 1 (JP-T-2003-531389)). The chromatography device described in Patent Literature 1 includes a processing zone configured to house the separation column and a heating portion configured to cause air to circulate while heating the air to heat the separation column in the processing zone. The heating portion has a coil (a heater) configured to generate heat by power distribution and an air blower fan.

However, in the chromatography described in Patent Literature 1, there is a problem that depending on the flow rate (the wind volume) of the circulating air, uneven heating such as excessive heating of the separation column or insufficient heating of the separation column is caused.

SUMMARY OF THE INVENTION

An object of the present invention is to provide a column oven and a chromatography configured so that an analysis column can be uniformly heated.

A column oven comprises: a hollow housing; an analysis column arranged in the housing and allowing circulation of a mobile phase in the analysis column; a heating portion configured to heat air; a swirl flow generation portion configured to discharge, as a swirl flow, the air heated by the heating portion into the housing; and a throttle portion configured to throttle the swirl flow when the swirl flow is discharged into the housing. The throttle portion has multiple through-holes formed to penetrate the throttle portion along a direction of discharging the swirl flow and arranged in a honeycomb shape as viewed from a swirl flow discharge side.

According to the present invention, air can contact the analysis column when passing through a housing, and can heat the analysis column. At this point, the temperature of the air decreases as the air passes through the housing (as the air flows apart from a heating portion). However, a flow rate is increased by a throttle portion, and therefore, a temperature decrease in the housing can be suppressed as much as possible. With this configuration, the entirety of the analysis column can be uniformly heated.

DETAILED DESCRIPTION OF THE EXEMPLARY EMBODIMENTS

Hereinafter, a column oven and a chromatography of the present invention will be described in detail based on a preferred embodiment illustrated in the attached drawings.

Figure 1:
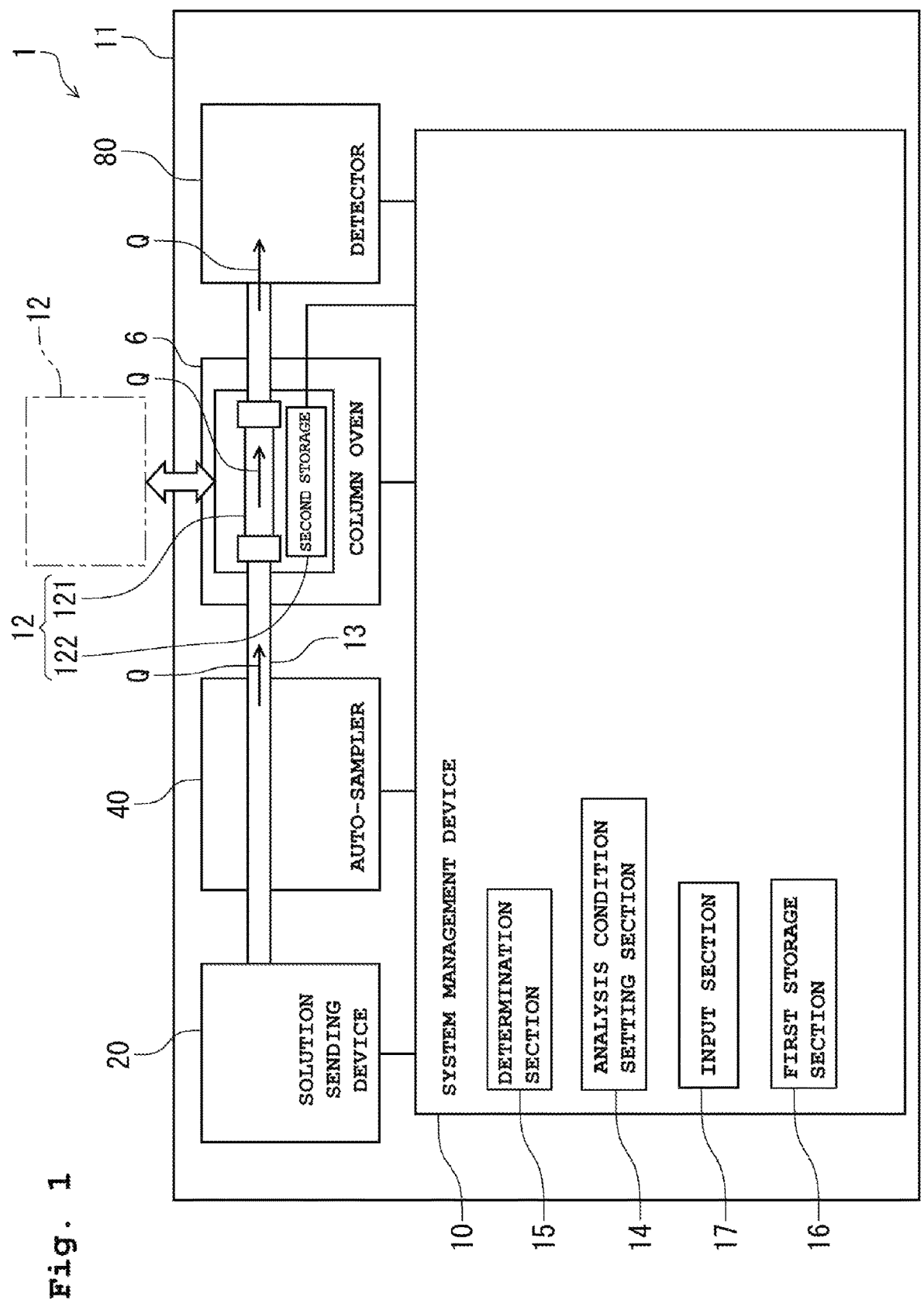
FIG. 1 is a schematic diagram (a block diagram) of an embodiment of a chromatography system of the present invention.
Figure 2:
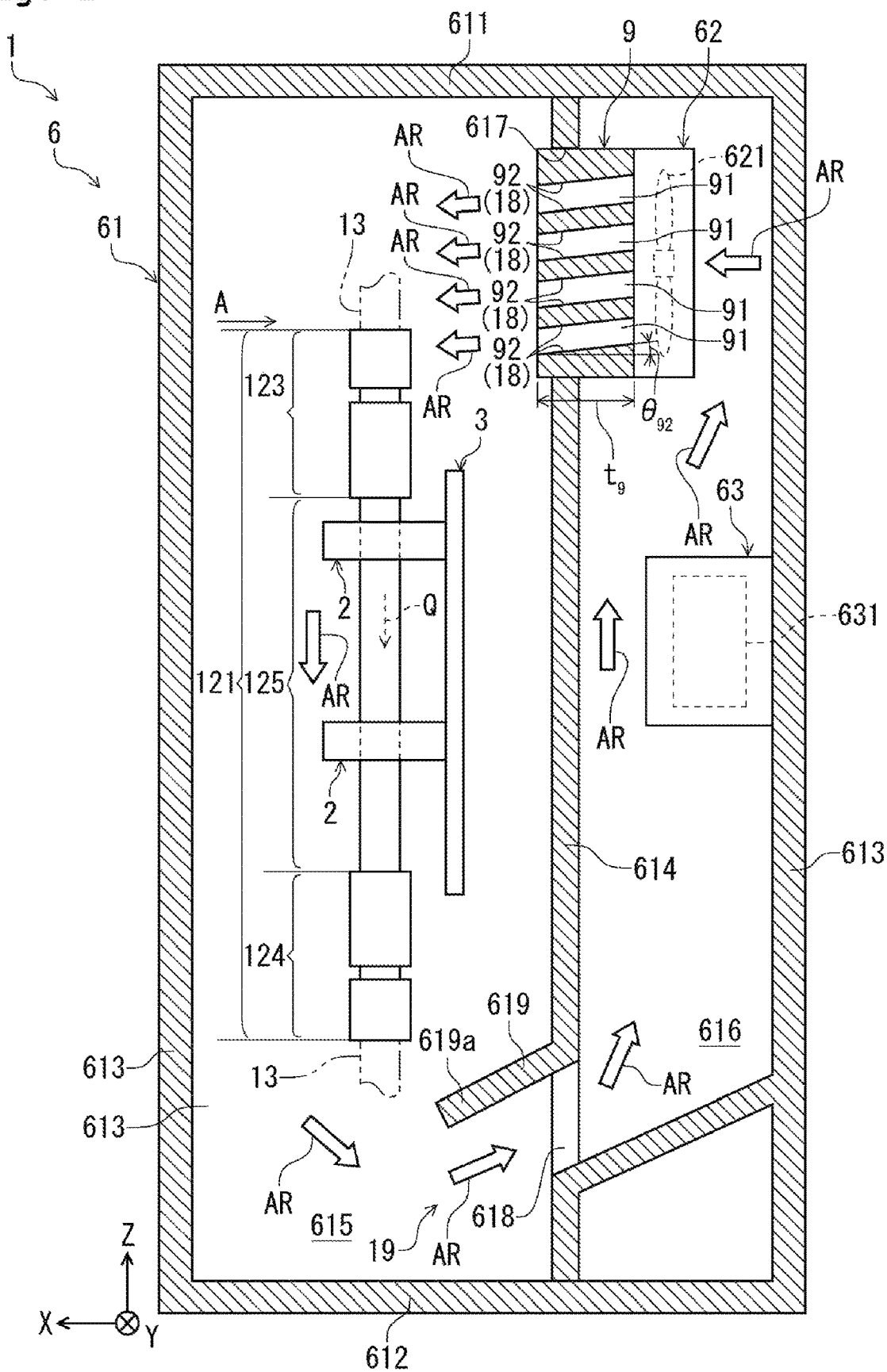
FIG. 2 is a partial vertical sectional view of an internal structure of a column oven provided at the chromatography system illustrated in FIG. 1.
Figure 3:
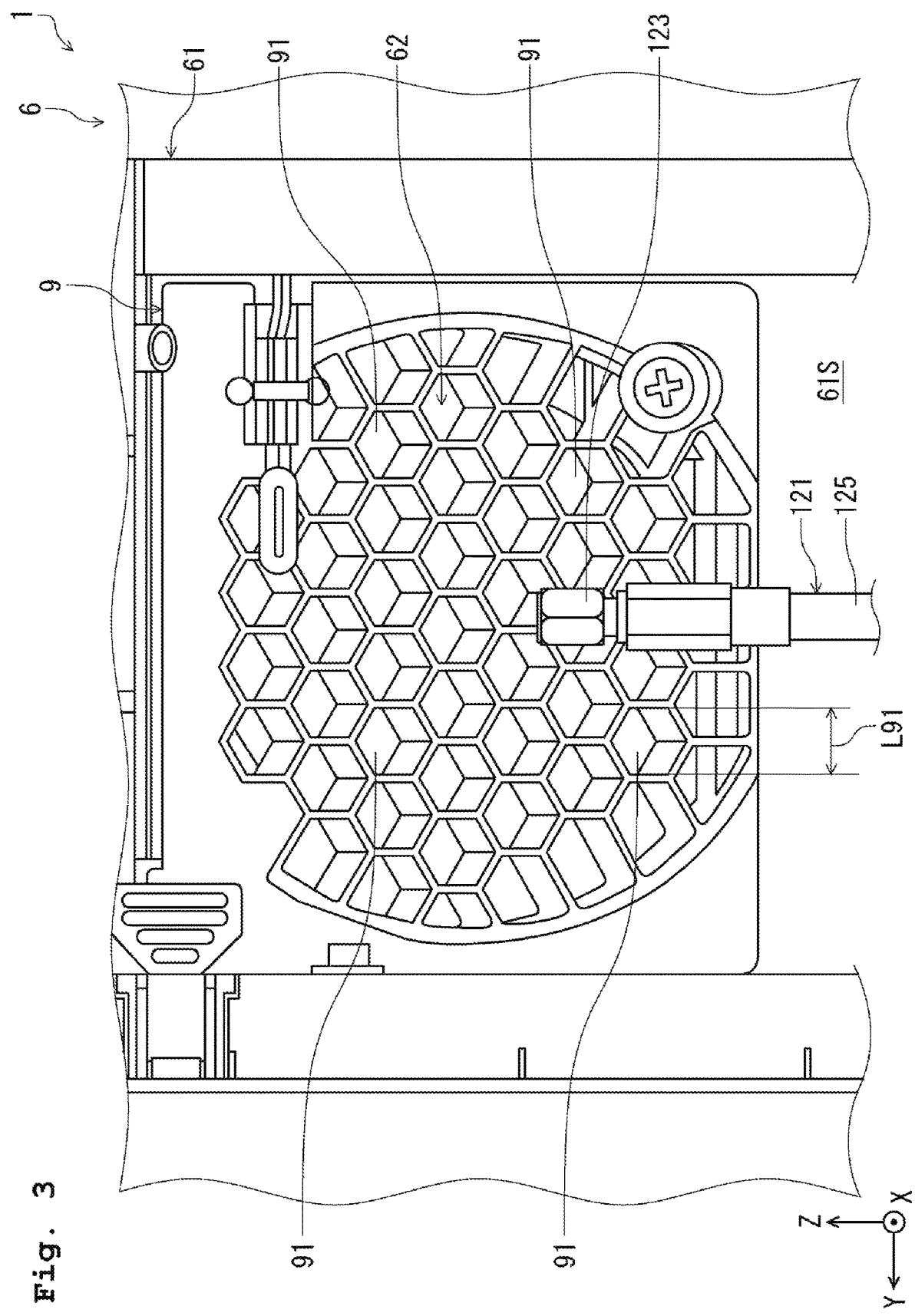
FIG. 3 is a view from a direction indicated by an arrow A of FIG. 2.

FIG. 1 is a schematic diagram (a block diagram) of an embodiment of a chromatography system of the present invention. FIG. 2 is a partial vertical sectional view of an internal structure of a column oven provided at the chromatography system illustrated in FIG. 1. FIG. 3 is a view from a direction indicated by an arrow A of FIG. 2.

Note that for the sake of convenience in description, one direction of the horizontal direction will be hereinafter referred to as an "X-axis direction," a direction perpendicular to the X-axis direction of the horizontal direction will be hereinafter referred to as a "Y-axis direction," and the vertical direction, i.e., a direction perpendicular to the X-axis direction and the Y-axis direction, will be hereinafter referred to as a "Z-axis direction." Moreover, aside indicated by an arrow in each axial direction will be referred to as a "positive side," and a side opposite to the arrow will be referred to as a "negative side." Further, an upper side in FIGS. 2 and 3 will be referred to as "upper (or above)," and a lower side will be referred to as "lower (or below)."

Hereinafter, a case where a chromatography system 1 is applied to a liquid chromatography system configured to perform analysis for a liquid sample as one type of mobile phase Q under multiple analysis conditions will be described as one example, but the chromatography system 1 is also similarly applicable to a supercritical fluid chromatography system and a gas chromatography system.

As illustrated in FIG. 1, the chromatography system 1 includes a solution sending device 20, an auto-sampler 40, a column oven 6, a detector 80, and a system management device 10 forming a device main body 11 in the chromatography system 1; and a replaceable analysis column 121 detachable from the device main body 11.

The solution sending device 20, the auto-sampler 40, the column oven 6, and the detector 80 are arranged in this order along a flow direction of the mobile phase Q, i.e., from an upstream side to a downstream side. Moreover, the solution sending device 20, the auto-sampler 40, the column oven 6, and the detector 80 are connected to each other through a pipe forming a flow path 13. The mobile phase Q can circulate in the flow path 13.

Note that in addition to the sample targeted for analysis, examples of the mobile phase Q include a buffer solution used upon analysis and a cleaning solution such as an organic solvent for cleaning a stationary phase.

Moreover, the system management device 10 is electrically connected to the solution sending device 20, the auto-sampler 40, the column oven 6, and the detector 80. The system management device 10 includes, for example, a CPU configured to execute logical operation, a ROM configured to store an operation program necessary for control of the solution sending device 20 and the like, and a RAM configured to temporarily store data and the like upon control. The system management device 10 can control the entirety of the chromatography system 1.

The solution sending device 20 has, for example, a solution sending pump, and by such a solution sending pump, the mobile phase Q can be transferred to the downstream side in the flow path 13. Moreover, the number of rotations of the solution sending pump is changed so that the transfer speed of the mobile phase Q can be adjusted.

The auto-sampler 40 is for injecting the mobile phase Q into the flow path 13.

The column oven 6 can be filled with the analysis column 121. Thus, the analysis column 121 is arranged in the middle of the flow path 13, and the sample can be injected into the mobile phase Q from the auto-sampler 40 and can circulate (pass) in the analysis column 121. At this point, such a sample can be separated into multiple components.

The column oven 6 can heat the analysis column 121 together with the sample. Thus, the temperature of the sample can be adjusted to a predetermined temperature. A configuration of the column oven 6 will be described later.

The detector 80 is for detecting the components separated in the analysis column 121.

Moreover, as illustrated in FIG. 1, the chromatography system 1 includes the system management device 10. The system management device 10 includes an analysis condition setting section 14, a determination section 15, an input section 17, and a first storage section 16.

Moreover, in the chromatography system 1, the analysis column 121 and a second storage section 122 attached to the analysis column 121 together form a column unit 12. Upon replacement of the analysis column 121, the analysis column 121 and the second storage section 122 are together replaced.

The analysis condition setting section 14 can set the multiple analysis conditions. The analysis conditions include, for example, the type of sample and the type of stationary phase charged into the analysis column 121. Thus, the chromatography system 1 can analyze the sample under the multiple analysis conditions.

For example, in a case where there are two types of samples targeted for analysis, the analysis condition setting section 14 sets a first analysis condition when analysis is performed for one of the samples, and sets a second analysis condition different from the first analysis condition when analysis is performed for the other sample. The analysis column 121 suitable for analysis for one of the samples is used under the first analysis condition, and the analysis column 121 suitable for analysis for the other sample is used under the second analysis condition.

The determination section 15 determines, for example, whether or not the analysis condition set by the analysis condition setting section 14 can be selected.

The first storage section 16 stores mobile phase information regarding the type of mobile phase Q in advance, for example. The first storage section 16 can store, for example, the mobile phase information with the name or number of the mobile phase Q.

The second storage section 122 stores second information as individual information on the analysis column 121, for example. In the present embodiment, the analysis column 121 is specified by the type of stationary phase charged into the analysis column 121. Moreover, the analysis column 121 itself can be specified by the second information.

Next, the configuration of the column oven 6 will be described.

As illustrated in FIG. 2, the column oven 6 includes a hollow housing 61, a swirl flow generation portion 62 configured to generate a swirl flow in the housing 61, a heating portion 63 configured to heat the analysis column 121 in the housing 61, multiple holding portions 2 configured to hold the analysis column 121 in the housing 61, a plate-shaped stationary plate 3 to which the holding portions 2 are detachably fixed in the housing 61, and a throttle portion 9 as a discharge member configured to discharge the swirl flow.

The housing 61 includes a box body having an upper wall portion 611 arranged on the upper side, a lower wall portion 612 arranged on the lower side, and multiple side wall portions 613 arranged between the upper wall portion 611 and the lower wall portion 612. Note that at least these wall portions of the housing 61 preferably have thermal insulating properties.

Moreover, the housing 61 has a partition wall portion 614 configured to divide the inside of the housing 61 into a first space 615 and a second space 616. In the configuration illustrated in FIG. 2, the partition wall portion 614 divides the first space 615 to the positive side in the X-axis direction, and divides the second space 616 to the negative side in the X-axis direction. Moreover, the analysis column 121, the holding portions 2, and the stationary plate 3 are arranged in the first space 615. On the other hand, the swirl flow generation portion 62 and the heating portion 63 are arranged in the second space 616. Further, the throttle portion 9 is arranged between the first space 615 and the second space 616, i.e., at the partition wall portion 614.

The heating portion 63 has a heater 631 configured to generate heat by power distribution, and the heater 631 generates heat to heat air AR in the housing 61 (the second space 616). By such air AR, the analysis column 121 held by the holding portions 2 and the sample can be heated together. In this manner, the temperature of the sample can be adjusted to the predetermined temperature.

The swirl flow generation portion 62 is arranged on the upper side with respect to the heating portion 63. The swirl flow generation portion 62 discharges, as the swirl flow, the air AR heated by the heating portion 63 into the first space 615. Then, the air AR discharged into the first space 615 is provided for heating the analysis column 121.

The swirl flow generation portion 62 has a rotatably-supported fan 621, and such a fan rotates to generate the swirl flow. In this manner, the air AR heated by the heating portion 63 can be reliably discharged into the first space 615.

Moreover, the partition wall portion 614 includes a fixing port 617 at which the throttle portion 9 configured to discharge the air AR into the first space 615 is arranged in a fixed manner, and a suction port 618 positioned below the fixing port 617 and configured to suck the air AR in the first space 615 into the second space 616. Thus, the air AR can circulate between the first space 615 and the second space 616. By such circulation, the air AR is heated by the heating portion 63 in the second space 616, and thereafter, can heat the analysis column 121 in the first space 615. Thus, the air AR provided for heating the analysis column 121 and having a decreased temperature can be heated again, and therefore, the temperature of the air AR can be promptly increased to a desired temperature.

Note that the analysis column 121 is heated by the circulating air AR in the column oven 6, but the present invention is not limited to above. For example, it may be configured such that the analysis column 121 is heated by radiation heat (radiated heat) by a heating block.

The analysis column 121 is in an elongated shape, and is arranged along the vertical direction, i.e., the Z-axis direction, in the first space 615 of the housing 61. Note that the analysis column 121 is arranged along the Z-axis direction in the present embodiment, but the present invention is not limited to above. For example, the analysis column 121 may be arranged along the X-axis direction or the Y-axis direction.

The analysis column 121 has a base end portion 123 positioned on the upstream side in the flow direction of the mobile phase Q, a tip end portion 124 positioned on the downstream side in the flow direction, and an intermediate portion 125 between the tip end portion 124 and the base end portion 123. In the present embodiment, the analysis column 121 is used with the base end portion 123 being arranged on the upper side and the tip end portion 124 being arranged on the lower side.

Of the base end portion 123, the tip end portion 124, and the intermediate portion 125 of the analysis column 121, the intermediate portion 125 is held by the holding portions 2. In the present embodiment, the intermediate portion 125 has a circular cross-sectional shape, and the outer diameter thereof is constant along the Z-axis direction.

As illustrated in FIG. 2, the analysis column 121 is held by two holding portions 2 in the first space 615. These two holding portions 2 are preferably separated from each other as much as possible in the Z-axis direction. With this configuration, the state of holding the analysis column 121 is stabilized. Note that the number of holding portions 2 used for holding the analysis column 121 is two in the present embodiment, but the present invention is not limited to above. For example, the number of holding portions 2 may be one or three or more.

Moreover, each holding portion 2 is fixed to the housing 61 through the stationary plate 3. As illustrated in FIG. 2, the stationary plate 3 is in a plate shape, and as a whole, is arranged parallel with a Y-axis and a Z-axis, i.e., parallel with a YZ plane.

As described above, the throttle portion 9 is fixed to the fixing port 617 of the partition wall portion 614. As illustrated in FIG. 2, the throttle portion 9 is arranged on the positive side in the X-axis direction, i.e., on the downstream side, with respect to the swirl flow generation portion 62. Moreover, the throttle portion 9 is arranged on a base end portion 123 side as an upper end portion of the analysis column 121. The throttle portion 9 arranged as described above can throttle the swirl flow when the swirl flow of the air AR generated in the swirl flow generation portion 62 is discharged into the housing 61. Thus, the flow rate of the air AR can be increased.

The throttle portion 9 has multiple through-holes 91 formed to penetrate the throttle portion 9 along the direction of discharging the air AR (the swirl flow). As illustrated in FIG. 3, these through-holes 91 are arranged in a honeycomb shape as viewed from an air AR discharge side, i.e., the positive side in the X-axis direction. With such arrangement, the flow rate of the air AR is not necessarily increased by adjustment of the number of rotations of the fan 621, and the flow rate of the air AR can be easily increased without excess or deficiency while being maintained constant.

In the column oven 6, the air AR can contact the analysis column 121 when passing through the first space 615, thereby heating the analysis column 121. At this point, the temperature of the air AR decreases as the air AR passes through the first space 615 (as the air AR flows apart from the heating portion 63). However, the flow rate is increased as described above, and therefore, a temperature decrease in the first space 615 can be suppressed as much as possible. Thus, the analysis column 121 can be uniformly heated from the base end portion 123 to the tip end portion 124. Moreover, by the throttle portion 9, influence of a swirl flow rotation direction on temperature distribution in the first space 615 can be prevented or reduced. Thus, uneven heating can be prevented, and therefore, the entirety of the analysis column 121 can be more uniformly heated.

Moreover, as illustrated in FIG. 3, each through-hole 91 is in a hexagonal shape as viewed from the air AR discharge side. A distance $L_{91}$ between a pair of opposing surfaces of the hexagonal shape is preferably equal to or greater than 5 mm and equal to or less than 10 mm, and more preferably equal to or greater than 6 mm and equal to or less than 9 mm. With this configuration, a throttle function at each through-hole 91 can be maintained while smooth passage of the air AR can be made. Moreover, in the case of employing such a more preferable numerical range, the throttle portion 9 also functions as a finger guard configured to prevent, e.g., a finger from entering the fan 621.

Depending on the volume of the first space 615, the total opening area of the through-holes 91 as viewed from the air AR discharge side is, for example, preferably equal to or higher than 60% with respect to the opening area of the fixing port 617, and more preferably about 75% for decreasing a pressure loss influencing the flow rate of the air AR.

The throttle portion 9 includes a plate-shaped member in the present embodiment, and the thickness $t_9$ thereof is preferably equal to or greater than 5 mm for a rectification effect at a later-described rectification portion 18. However, in a case where an inclined surface 92 has an inclination angle $\theta_{92}$ of about 15° for the rectification effect (a louver effect), the thickness $t_9$ is more preferably about 15 mm for decreasing the pressure loss.

Note that a material forming the throttle portion 9 is not specifically limited, and for example, various resin materials are preferably used. The resin material has a lower heat conductivity than that of a metal material, and can prevent removal of heat of the air AR when the air AR passes through each through-hole 91, for example.

As illustrated in FIG. 2, an inner peripheral surface of each through-hole 91 has the inclined surfaces 92 inclined with respect to the horizontal direction, i.e., an XY plane. The inclined surfaces 92 are provided on the upper and lower sides in each through-hole 91. Moreover, each inclined surface 92 has a function as the rectification portion 18 configured to direct the air AR (the swirl flow) throttled by the throttle portion 9 to an analysis column 121 side. Thus, the air AR can smoothly contact the analysis column 121, and therefore, prompt heating of the analysis column 121 can be performed.

A relatively-great degree of the inclination angle $\theta_{92}$ of each inclined surface 92 with respect to the horizontal direction results in a great pressure loss, and the flow rate of the air AR decreases. For this reason, such an inclination angle $\theta_{92}$ is preferably about 15°. Moreover, the through-holes 91 may have the same inclination angle $\theta_{92}$ or different inclination angles $\theta_{92}$. In a case where the through-holes 91 have the different inclination angles $\theta_{92}$, the inclination angle $\theta_{92}$ in the upper through-hole 91 can be set greater than the inclination angle $\theta_{92}$ in the lower through-hole 91.

As described above, in the present embodiment, it is configured such that the throttle portion 9 has the function as the rectification portion 18. Thus, the number of components can be reduced as compared to a case where the throttle portion 9 and the rectification portion 18 are configured as separated bodies, and therefore, the cost for manufacturing the column oven 6 can be reduced.

Note that the throttle portion 9 and the rectification portion 18 may be configured as separated bodies. In this case, the rectification portion 18 is, on the downstream side, preferably arranged adjacent to the throttle portion 9.

The suction port 618 forming part of a suction portion 19 is positioned on a tip end portion 124 side as a lower end portion of the analysis column 121.

Moreover, a protruding piece 619 protruding from the partition wall portion 614 toward a first space 615 side is provided above the suction port 618. The protruding piece 619 is inclined with respect to the horizontal direction, and a lower portion 619a in such an inclination direction is positioned below the tip end portion 124 of the analysis column 121. Thus, the direction of sucking the air AR into the suction port 618 can be restricted. By such restriction, the air AR flows toward the suction port 618 to flow around the protruding piece 619, and can sufficiently heat even the tip end portion 124 of the analysis column 121. Thus, a temperature difference between the base end portion 123 side and the tip end portion 124 side in the analysis column 121 can be eliminated as much as possible, and the analysis column 121 is brought into a state suitable for analysis.

As described above, the suction portion 19 has the protruding piece 619 as a restriction portion configured to restrict the direction of sucking the air AR into the suction port 618.

The column oven and the chromatography of the present invention have been described above with reference to the illustrated embodiment, but the present invention is not limited to above. Each portion forming the column oven and the chromatography can be replaced with one having an optional configuration providing a similar function. Moreover, an optional component may be added.

[Aspects]

Those skilled in the art understand that the above-described multiple exemplary embodiments are specific examples of the following aspects.

A column oven of a first aspect comprises: a hollow housing; an analysis column arranged in the housing and allowing circulation of a mobile phase in the analysis column; a heating portion configured to heat air; a swirl flow generation portion configured to discharge, as a swirl flow, the air heated by the heating portion into the housing; and a throttle portion configured to throttle the swirl flow when the swirl flow is discharged into the housing. The throttle portion has multiple through-holes formed to penetrate the throttle portion along a direction of discharging the swirl flow and arranged in a honeycomb shape as viewed from a swirl flow discharge side.

According to a column oven of a first aspect, air can contact an analysis column when passing through a housing, thereby heating the analysis column. At this point, the temperature of the air decreases as the air passes through the housing (as the air flows apart from a heating portion). However, a flow rate is increased by a throttle portion, and therefore, a temperature decrease in the housing can be suppressed as much as possible. Thus, the entirety of the analysis column can be uniformly heated.

In a column oven of a second aspect, each through-hole is in a hexagonal shape as viewed from the swirl flow discharge side, and a distance between a pair of opposing surfaces of the hexagonal shape is equal to or greater than 5 mm and equal to or less than 10 mm.

According to a column oven of a second aspect, a throttle function at each through-hole 91 can be maintained while smooth passage of air AR is allowed.

The column oven of a third aspect further comprises: a holding portion configured to hold the analysis column along a vertical direction. The throttle portion is arranged on an upper end side of the analysis column.

According to a column oven of a third aspect, an analysis column can be uniformly heated from an upper end portion to a lower end portion thereof.

The column oven of a fourth aspect further comprises: a rectification portion configured to direct the swirl flow throttled by the throttle portion to the analysis column side.

According to a column oven of a fourth aspect, air can smoothly contact an analysis column, and therefore, prompt heating of the analysis column can be performed.

In a column oven of a fifth aspect, the throttle portion has a function as the rectification portion.

According to a column oven of a fifth aspect, the number of components can be reduced as compared to a case where a throttle portion and a rectification portion are configured as separated bodies, and therefore, the cost for manufacturing the column oven can be reduced.

In the column oven a sixth aspect, an inner peripheral surface of each through-hole has an inclined surface inclined with respect to a horizontal direction and having the function as the rectification portion.

According to a column oven of a sixth aspect, a rectification portion can be provided with a simple configuration at a throttle portion.

In a column oven of a seventh aspect, the throttle portion includes a plate-shaped member having a thickness of equal to or greater than 5 mm.

According to a column oven of a seventh aspect, in a case where a thickness falls, for example, below the lower limit of the numerical range of the thickness, the distance of passage of air through each through-hole becomes shorter, and for this reason, there is a probability that it is difficult to sufficiently fulfill a rectification function of a later-described rectification portion. Moreover, in a case where the thickness exceeds the upper limit of the numerical range of the thickness, the distance of passage of air through each through-hole becomes longer, and for this reason, there is a probability that a pressure loss is caused to such an extent that it is difficult to sufficiently supply air to a housing.

A column oven of an eighth aspect further comprises: a suction portion including a suction port provided on a lower end side of the analysis column and configured to suck the air in the housing and a restriction portion configured to restrict a direction of sucking the air into the suction port.

According to a column oven of an eighth aspect, air flows toward a suction port to flow around the suction port in a housing, and therefore, even a lowermost end portion of an analysis column can be sufficiently heated.

In a column oven of a ninth aspect, the heating portion heats the air sucked through the suction port.

According to a column oven of a ninth aspect, air can circulate in a housing. With this configuration, the air provided to the analysis column and having a decreased temperature can be heated again, and therefore, such air can be promptly increased to a desired temperature.

A chromatography of a tenth aspect comprises: the column oven.

According to a chromatography of a tenth aspect, air can contact an analysis column when passing through a housing, thereby heating the analysis column. At this point, the temperature of the air decreases as the air passes through the housing (as the air flows apart from a heating portion). However, a flow rate is increased by a throttle portion, and therefore, a temperature decrease in the housing can be suppressed as much as possible. Thus, the entirety of the analysis column can be uniformly heated.

What is claimed is:

1. A column oven comprising:
   a hollow housing;
   an analysis column arranged in the hollow housing and along a vertical direction and allowing circulation of a mobile phase in the analysis column;
   a heating portion configured to heat air;

a holding portion configured to hold the analysis column along the vertical direction;

a swirl flow generation portion arranged at an upper end side of the analysis column and configured to discharge, as a swirl flow, the air heated by the heating portion into the hollow housing; and a throttle portion arranged at the upper end side of the analysis column and configured to throttle the swirl flow when the swirl flow is discharged into the hollow housing, wherein the swirl flow generation portion and the throttle portion are arranged only in an upper end side of the analysis column, a suction port arranged at a lower end side of the analysis column and to suck an air in the hollow housing into a space where the heating portion is arranged without swirl flow generation occurring at the suction port, and the throttle portion has multiple through-holes formed to penetrate the throttle portion along a direction of discharging the swirl flow and arranged in a honeycomb shape as viewed from a swirl flow discharge side.

2. The column oven according to claim 1, wherein each through-hole is in a hexagonal shape as viewed from the swirl flow discharge side, and a distance between a pair of opposing surfaces of the hexagonal shape is equal to or greater than 5 mm and equal to or less than 10 mm.

3. The column oven according to claim 1, further comprising:

a rectification portion configured to direct the swirl flow to an analysis column side.

4. The column oven according to claim 3, wherein the throttle portion serves as the rectification portion to direct the swirl flow in addition to throttling the swirl flow.

5. The column oven according to claim 4, wherein an inner peripheral surface of each through-hole of the throttle portion has an inclined surface inclined with respect to a horizontal direction, the inclined surface of each through-hole of the throttle portion functioning as the rectification portion.

6. The column oven according to claim 1, wherein the throttle portion includes a plate-shaped member having a thickness of equal to or greater than 5 mm.

7. The column oven according to claim 1, further comprising:

a suction portion including a suction port provided on a lower end side of the analysis column and configured to suck the air in the housing and a restriction portion configured to restrict a direction of sucking the air into the suction port.

8. The column oven according to claim 7, wherein the heating portion heats the air sucked through the suction port.

9. The column oven according to claim 1, wherein the hollow housing has a partition wall portion configured to divide the inside of the hollow housing into a first space and a second space, the analysis column is arranged in the first space, the swirl flow generation portion and the heating portion are arranged in the second space, the throttle portion is arranged at the partition wall portion, and the partition wall portion includes a suction port to suck the air in the first space into the second space, so that the air circulates between the first space and the second space.

10. The column oven according to claim 9, wherein the throttle portion is arranged downstream the swirl flow generation portion in the upper end side of the analysis column.

11. The column oven according to claim 1, wherein the throttle portion is fixed within an opening area of a fixing port included in a partition wall portion within the hollow housing, and the total opening area of the through-holes of the throttle portion as viewed from the air discharge side is equal to or higher than 60% with respect to the opening area of the fixing port of the partition wall portion.

12. The column oven according to claim 1, wherein the throttle portion is made of a resin material.

13. A chromatography system, comprising:

the column oven according to claim 1;

an auto-sampler for providing samples to the analysis column; and a detector for detecting components separated by the analysis column.

* * * * *